United States Patent
Minshull

(10) Patent No.: US 6,684,601 B1
(45) Date of Patent: Feb. 3, 2004

(54) JIG LOADING SYSTEM

(75) Inventor: Alan J. Minshull, Chester (GB)

(73) Assignee: Airbus UK Limited, Bristol (GB)

( * ) Notice: Subject to any disclaimer, the term of this patent is extended or adjusted under 35 U.S.C. 154(b) by 183 days.

(21) Appl. No.: 09/465,941

(22) Filed: Dec. 17, 1999

(30) Foreign Application Priority Data

Dec. 19, 1998 (GB) .............................. 9827990

(51) Int. Cl.⁷ .......................... B65B 19/04; B23Q 1/00
(52) U.S. Cl. ........................... 53/152; 53/148; 29/445; 29/559; 269/43; 269/46
(58) Field of Search ............................ 269/46, 43, 47, 269/52; 29/445, 559; 53/147, 148, 152

(56) References Cited

U.S. PATENT DOCUMENTS

| | | | |
|---|---|---|---|
| 2,441,858 A | * 5/1948 | Watter | 29/148.2 |
| 2,634,450 A | * 4/1953 | Britton | 15/268 |
| 2,685,263 A | * 8/1954 | Barnes et al. | 108/5.4 |
| 2,948,047 A | * 8/1960 | Peeler et al. | 25/154 |
| 2,965,956 A | * 12/1960 | Jairett | 29/200 |
| 3,692,363 A | * 9/1972 | Tenebaum et al. | 298/24 |
| 3,814,531 A | 6/1974 | Carnahan et al. | |
| 3,815,890 A | * 6/1974 | Urban | 269/43 |
| 4,381,104 A | 4/1983 | Nelsen | |
| 4,402,541 A | 9/1983 | Bomberger et al. | |
| 4,671,724 A | 6/1987 | Bolton | |
| 4,894,903 A | 1/1990 | Woods | |
| 5,011,710 A | * 4/1991 | Harrison | 427/142 |
| 5,033,178 A | * 7/1991 | Woods | 29/281.1 |
| 5,143,266 A | * 9/1992 | Heckerman et al. | 224/150 |
| 5,199,147 A | 4/1993 | Whiteside | |
| 5,253,454 A | * 10/1993 | Carlson et al. | 51/240 R |
| 6,149,216 A | * 11/2000 | Allcott | 294/81.61 |
| 6,170,157 B1 | * 1/2001 | Munk et al. | 29/897.2 |

FOREIGN PATENT DOCUMENTS

| | | |
|---|---|---|
| DE | 768021 | 5/1955 |
| DE | 298 01 032 | 4/1998 |
| EP | 0886046 | 12/1998 |
| GB | 127710 | 6/1919 |
| GB | 238212 | 8/1926 |
| GB | 1521835 | 8/1978 |
| GB | 2 242 884 | 10/1991 |

* cited by examiner

Primary Examiner—Rinaldi I. Rada
Assistant Examiner—Christopher R Harmon
(74) Attorney, Agent, or Firm—Nixon & Vanderhye P.C.

(57) ABSTRACT

The jig loading system comprises an assembly of straps 10 for attachment to a support member 14 so as to hang downwardly in spaced apart positions. Each strap 10 has a releasable holder 16 thereon for supporting aircraft stringers 18 at spaced apart positions to enable the stringers to be positioned at the jig 24 for loading thereon. The holders 16 are loop-like and are openable and closeable by means of releasable spring clips 28.

9 Claims, 5 Drawing Sheets

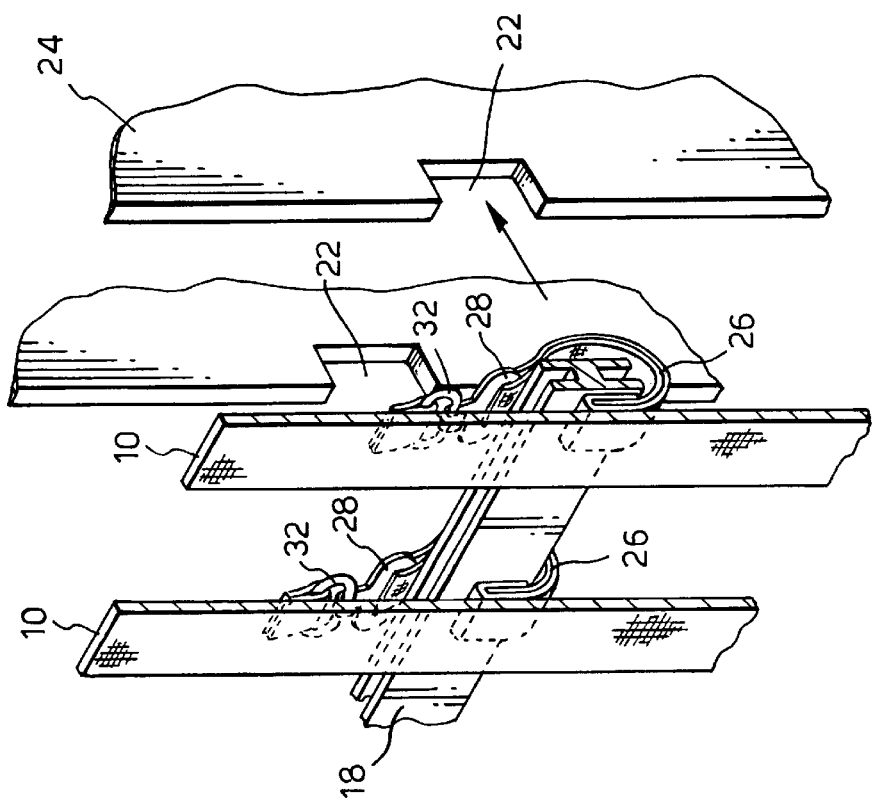
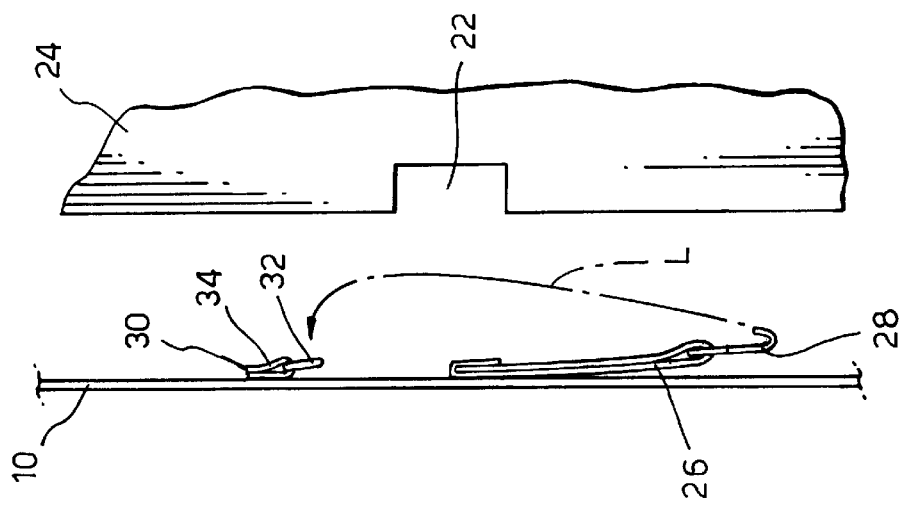

JIG LOADING SYSTEM

BACKGROUND TO THE INVENTION

The invention relates to a jig loading system and is primarily concerned with a system which will enable aircraft wing stringers to be positioned at a jig for loading thereon.

DESCRIPTION OF THE PRIOR ART

Aircraft wing stringers are commonly supplied to an aircraft manufacturer in a long box, typically up to twenty meters in length. After unpacking the individual stringers and removing a polythene wrapping, the stringers are traditionally laid on trestles and are then carried individually by hand from the trestle to a jig used for assembling the wing stringers on to a wing structure. The jig is arranged vertically with the wing span extending horizontally. The jig typically extends up to around 2.5 meters above floor level aid each stringer needs to be fitted into a prescribed slot and clamped in position. When all the wing stringers have been fitted into the jig, a wing skin is clamped in position on the jig so as to overlie the stringers in known manner.

As will be appreciated, the aforesaid traditional method of handling the stringers is totally manual and necessitates the availability of several operatives to handle the long stringers. Also, because of the extreme length and slender cross section of the stringers they can easily bend and whip when being carried. The stringers are also difficult to handle when being mounted on the higher parts of the jig in view of their size.

SUMMARY OF THE INVENTION

An object of the present invention is provide a jig loading system which will help reduce the problems outlined above and which will support wing stringers more positively at the jig prior to loading.

According to one aspect of the invention there is provided a jig loading system comprising an assembly of elongate members for attachment to a support member so as to hang downwardly in spaced apart positions, each elongate member having a releasable holder thereon, the holders of the assembly being arranged to support an aircraft stringer at spaced apart positions to enable the stringer to be supported at the jig for loading thereon.

With a system in accordance with the invention, the stringer can be supported along its length by the holders thereby reducing significantly the likelihood of unwanted bending or whip in the stringer during loading on to the jig.

Preferably, the holder of each elongate member is loop-like. In such a case the loop may be openable or closeable to enable the stringer to be positioned therein or released therefrom.

In a preferred embodiment, the holder is openable or closeable by means of a releasable spring clip. Preferably, the spring clip can e clipped to a ring or the like to close the holder. The spring clip or the ring is preferably arranged at one end of a length of material which is attached to its elongate member and the ring or spring clip is preferably arranged to provide an anchor which may be mounted on the elongate member to which the length of material is attached. In the preferred embodiment, the releasable spring clip is provided at said one end of the length of material. In such a case, a said ring may form the anchor.

The anchor may be mounted on the elongate member at a position adjacent an attachment point for an adjacent length of material which forms a said further holder on the elongate member.

In a preferred arrangement, each elongate member has a plurality of holders thereon at spaced apart intervals. In such a case, each holder on a said elongate member may overlap an adjacent holder to provide a staggered holder arrangement. That particular configuration provides increased flexibility with respect to the spacing of stringers supported by the holders. Normally, the holders on one of the spaced apart elongate members will be substantially aligned with corresponding holders on an adjacent elongate member.

Preferably, the elongate members are flexible and may conveniently take the form of straps. The flexibility facilitates transfer of stringers to the jig and also allows compact storage.

The moving of the stringers from the trestles to the jig involves repetitive journeys all taking up time and increasing the risk of possible damage. One of the advantages of the present invention is that the jig loading system can be assembled for transport as a package with a stringer in the holders. Where each of the elongate members has a plurality of holders thereon, a plurality of stringers may be positioned in the holders which are assembled as a package. For ease of unpacking, the support member is preferably attachable to the elongate members in the package whereby the assembly of elongate members and stringers can be unpacked by hoisting the support member by suitable means to lift the elongate members and the stringer or stringers thereon into a desired position at the jig. In that way, the stringers can be packed by the stringer manufacturer in such a way that the end user receives the stringers in a form ready for lifting straight up to the jig which is particularly useful from the point of view of jig loading time and ease of handling. If desired, the support member may be attached to the elongate members in the package thereby forming part of the package itself.

According to another aspect of the invention there is provided a method of packaging aircraft wing stringers for subsequent loading on to a jig, the method comprising providing a plurality of elongate flexible support members each of which has thereon a plurality of releasable holders, spacing the elongate members apart, positioning a plurality of stringers in said releasable holders so that the stringers lie alongside each other, forming the assembled elongate members and stringers as a package, transporting the package to a position near a jig, lifting the elongate members so as to unpack the assembly and positioning the stringers at the jig for loading thereon.

The method may include the use of features set out in any of the consistory clauses relating to the first said aspect of the invention.

BRIEF DESCRIPTION OF THE DRAWINGS

A jig loading system in accordance with the invention will now be described by way of example with reference to the accompanying drawings in which:

FIG. 4 is an edge view of one of the holders in an open position, FIG. 5 is a perspective view of two straps and the holders thereon supporting a stringer at a jig.

DESCRIPTION OF THE PREFERRED EMBODIMENT

Figure 1:
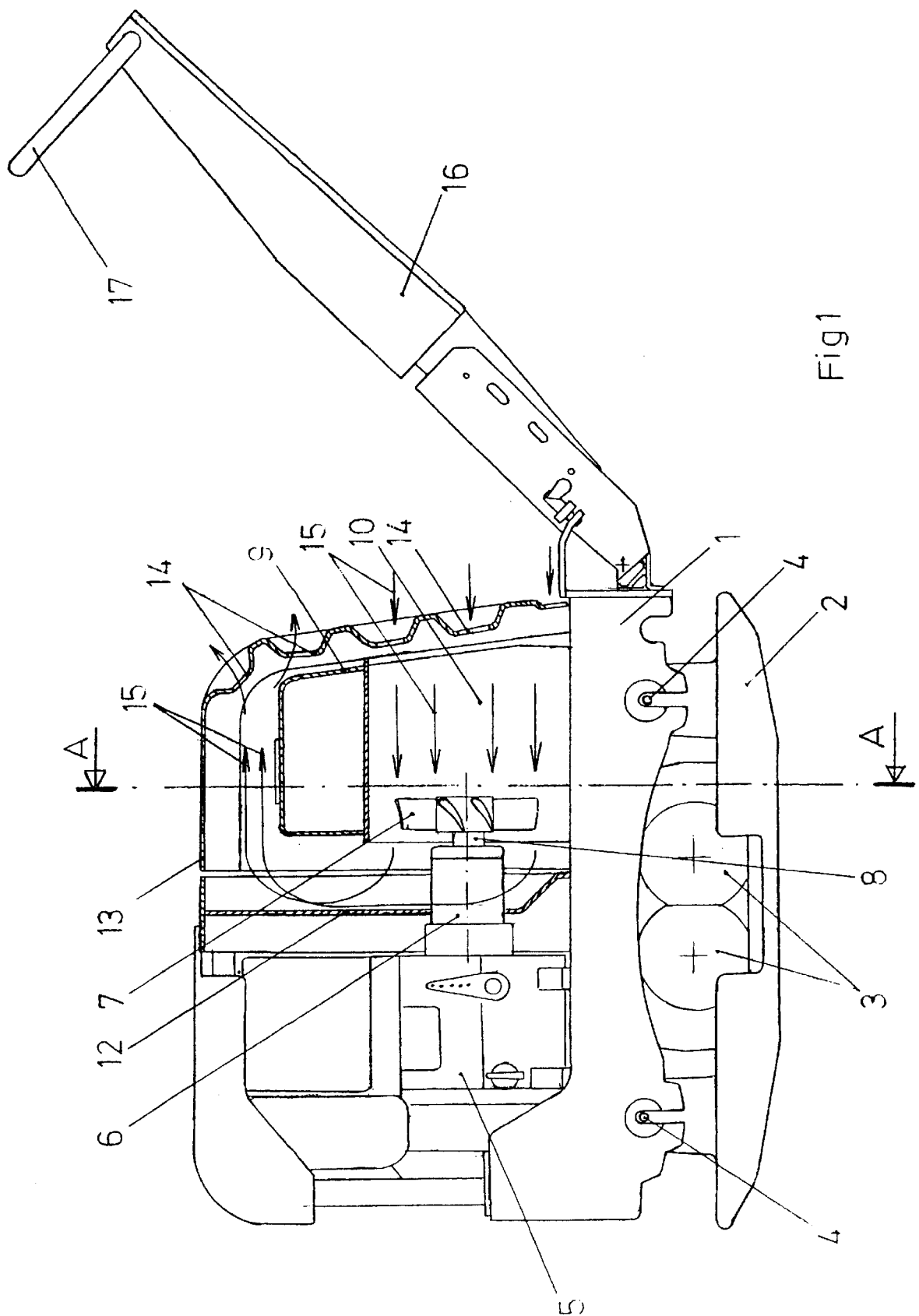
FIG. 1 is a diagrammatic perspective view of a jig loading system in accordance with the s invention with wing stringers in position in holders thereof.

Looking at FIG. 1, the jig loading system comprises a plurality of elongate members in the form of straps 10 which hang downwardly from rings 12 or other suitable connections attached to a support member in the form of a bar 14. Each strap 10 may be formed from a webbing-like fabric such as nylon and carries a plurality of holders 16 for wing stringers 18. It will be noted that the holders 16 on the straps 10 are substantially aligned with respective holders 16 of neighbouring straps 10 so as to support the stringers 18 at intervals over the major length of each stringer. The support bar 14 can be connected to an overhead crane by means of a chain 20. In that way the support bar 14 can be hoisted so as to position the stringers 18 substantially opposite horizontal rows of recesses 22 in a jig 24 (see FIGS. 4 and 5). Once in that position, the holders 16 are opened one at a time to enable the stringers 18 to be located in the recesses 22, the remaining holders 16 continuing to support the stringers 18 while that is being done. As will be appreciated, such an arrangement provides a means of supporting the stringers 18 at the jig 24 without requiring several workers to do so.

Figure 2:
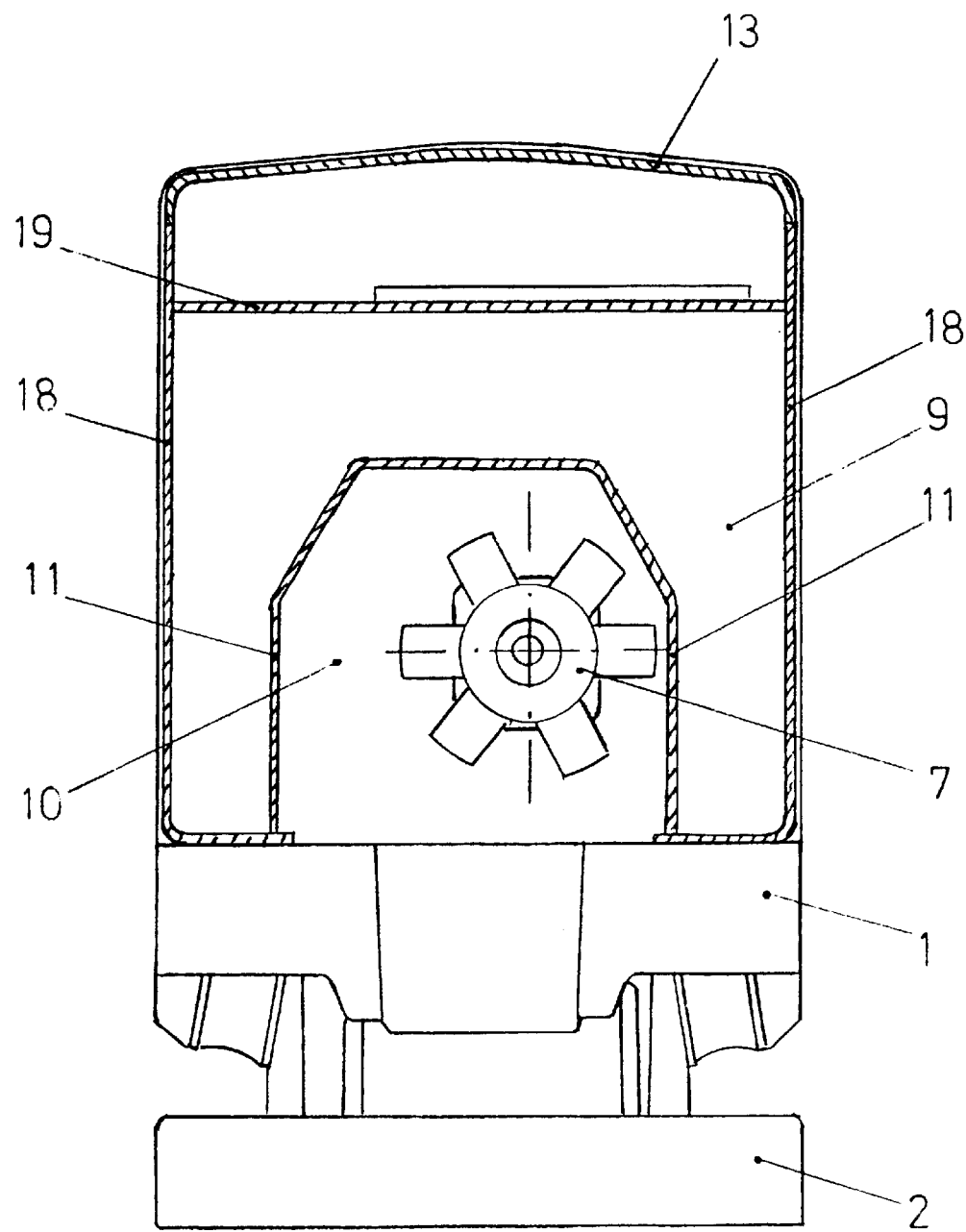
FIG. 2 is an elevation of part of a jig loading system in accordance with the invention in which holders are formed from lengths of material closeable by spring clips.

Referring to FIGS. 2 to 5 it will be seen in FIG. 2 that each hanging strap 10 carries strips of material 26 which are attached at upper ends as viewed in the drawings to the strap 10 and have spring retaining clips 28 of known kind at their lower ends. Immediately above each strip 26 is an anchor 30 comprising a metal ring 32 held in a loop of material 34 attached to the strap 10.

Figure 3:
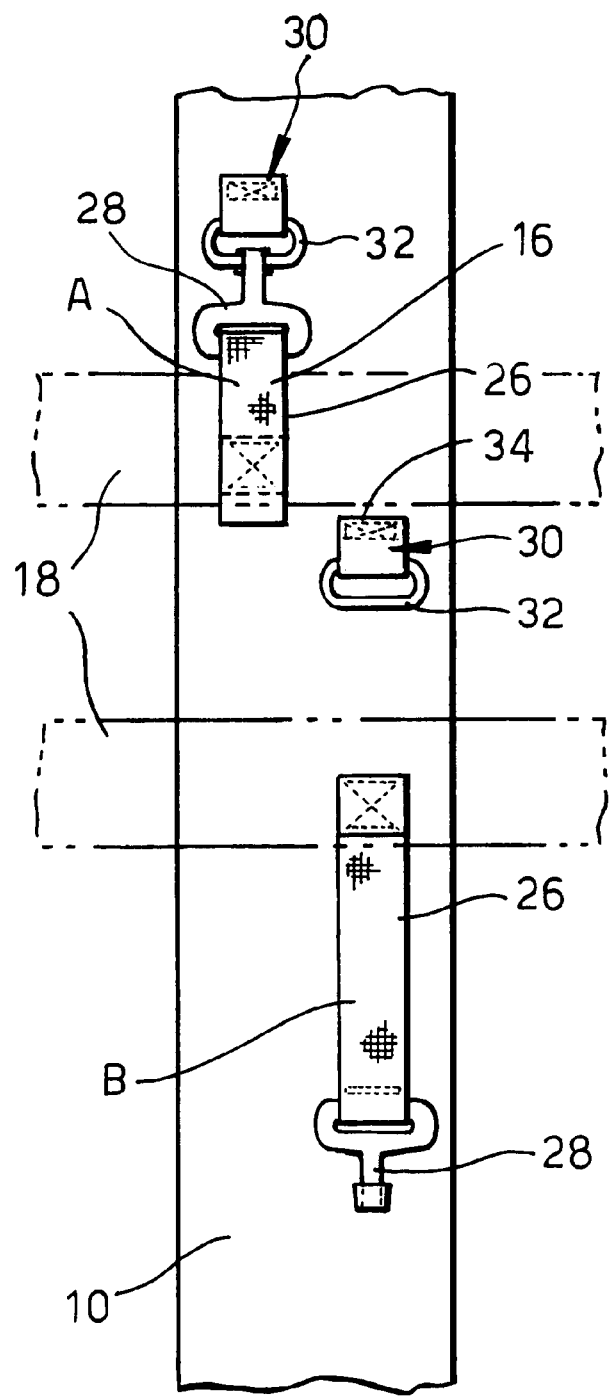
FIG. 3 is an elevation of a staggered arrangement of holders.

As shown in FIG. 3, the straps 10 can be made wide to enable the strips 26 and rings 32 to be staggered to keep strap length to a minimum. One of the holders 16 indicated at A is closed and one holder indicated at B is open.

In each of the above cases, the strips 26 and associated rings 32 on one strap 10 are substantially in horizontal alignment with corresponding strips 26 and rings 32 of neighbouring straps 10.

Figure 6:
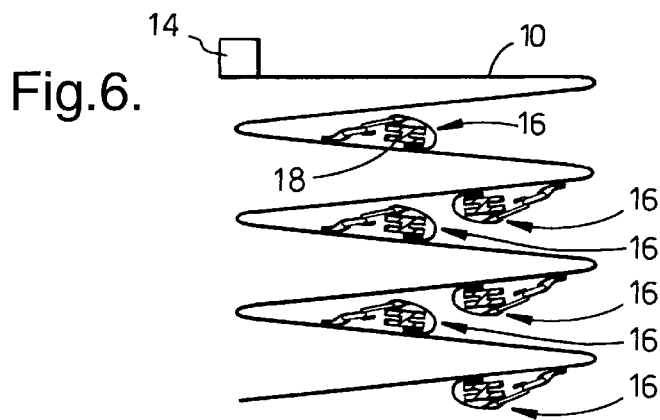
FIG. 6 is a diagrammatic view showing the way in which the jig loading system can be folded for transport as a package.

In order to form a holder 16, a spring clip 28 is lifted as shown by arrow L in FIG. 4 and is clipped on to the associated ring 32 as shown in FIG. 5. A stringer 18 can be retained in the holder 16 as shown in FIGS. 5 and 6. From FIG. 5 it will be seen that when a stringer 18 is supported by the holders 16, the strap 10 is positioned vertically to align the stringer with a row of recesses 22 in the jig 24, only two of such recesses can be seen in FIG. 5. Once the stringer 18 has been aligned with the recesses 22, the holders 16 can be opened in turn by releasing the spring clips 28 from the rings 32 to enable the stringer 18 to be placed in the recesses 22 in the jig 24.

Figure 7:
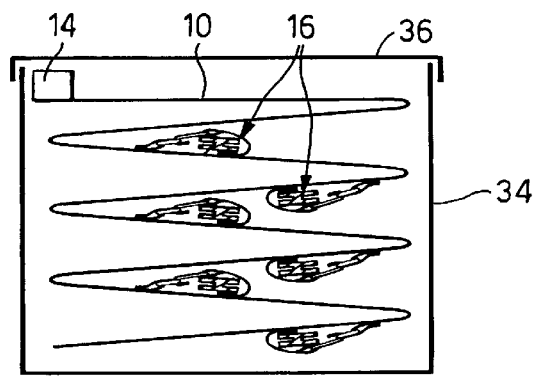
FIG. 7 shows the way in which the package of FIG. 6 can be packed into a carrying box and FIG. 8 is a diagrammatic plan view of the box of FIG. 7.
Figure 8:
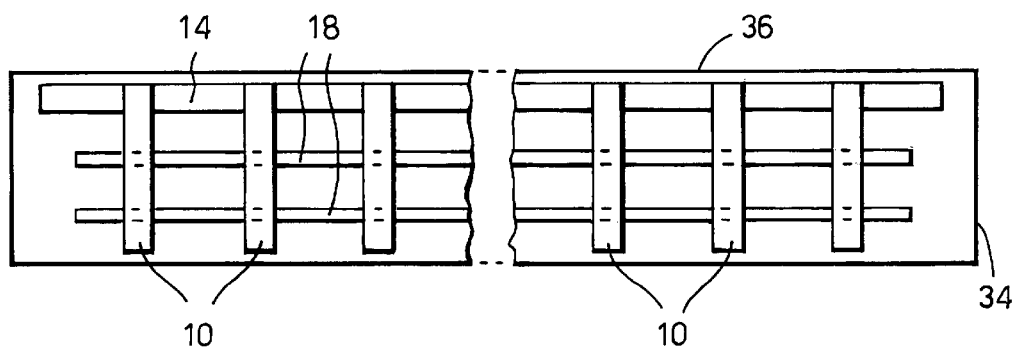

Referring now to FIGS. 6 to 8, the holders 16 on the straps 10 can be loaded with stringers 18 at the factory of a stringer manufacturer and the straps 10 can be folded in concertina manner as shown in FIGS. 6 and 7. Preferably, the upper ends of the straps 10 will be attached to the support bar 14 at suitable spaced positions. The folded straps 10 with the stringers 18 in situ are then packed in a box 34 which is fitted with a lid 36 for transporting to a wing build section at the factory of an aircraft manufacturer. Once the box has reached its destination, the box 34 is positioned near the jig 24 and the lid 36 is removed. An overhead crane is then used to hoist the support bar 14 and lift the straps 10 into positions next to the jig 24 to align the stringers 18 With the recesses 22 in the jig 24 ready for loading. The spacing of the strips 26 on the straps 10 is designed to match the spacing requirements of the stringers 18 for the particular jig 24 concerned.

The invention significantly reduces jig loading time and the risks and difficulties involved in having to carry the stringers 18 manually from an unpacking point to a loading position at the jig 24.

What is claimed is:

1. An aircraft assembly jig loading system comprising:

a support member;

a plurality of elongate members, each of said elongate members is attached at one end to said support member in spaced apart positions along said support member, each elongate member hanging downward from said support member; and at least one releasable holder on each elongate member, the holders positioned to support at least one aircraft stringer at spaced apart positions to enable the stringer to be supported at an aircraft assembly jig for loading thereon, wherein the holder of each elongate member is a loop.

2. An aircraft assembly jig loading system comprising:

a support member;

a plurality of elongate members, each of said elongate members is attached at one end to said support member in spaced apart positions along said support member, each elongate member hanging downward from said support member; and at least one releasable holder on each elongate member, the holders positioned to support at least one aircraft stringer at spaced apart positions to enable the stringer to be supported at an aircraft assembly jig for loading thereon, in which the holder can be opened to enable the stringer to be positioned therein and released therefrom, in which the holder is openable by means of a releasable spring clip, wherein the spring clip can be clipped to a ring to close the holder.

3. A jig loading system according to claim 2 which one of the spring clip and ring is arranged at one end of a strip of material which is attached to its elongate member and the other of the ring and spring clip is arranged to provide an anchor.

4. A jig loading system according to claim 3 in which the anchor is mounted on the elongate member to which the strip of material is attached.

5. A jig loading system according to claim 3 in which the anchor is mounted on the elongate member at a position adjacent an attachment point for an adjacent strip of material which forms a further holder on the elongate member.

6. An aircraft assembly jig loading system comprising:

a support member;

a plurality of elongate members, each of said elongate members is attached at one end to said support member in spaced apart positions along said support member, each elongate member hanging downward from said support member; and at least one releasable holder on each elongate member, the holders positioned to support at least one aircraft stringer at spaced apart positions to enable the stringer to be supported at an aircraft assembly jig for loading thereon, in which each elongate member has a plurality of holders thereon at spaced apart intervals, wherein each holder on a said elongate member overlaps an adjacent holder to provide a staggered holder arrangement.

7. An aircraft assembly jig loading system comprising:

a support member;

a plurality of elongate members, each of said elongate members is attached at one end to said support member in spaced apart positions along said support member, each elongate member hanging downward from said support member; and at least one releasable holder on each elongate member, the holders positioned to support at least one aircraft stringer at spaced apart positions to enable the stringer to be supported at an aircraft assembly jig for loading thereon, wherein the elongate members are flexible.

8. A jig loading system according to claim 7 in which the elongate members are in the form of straps.

9. A method of packaging aircraft stringers in accordance with the jig loading system comprising:

a support member;

a plurality of elongate members, each of said elongate members is attached at one end to said support member in spaced apart positions along said support member, each elongate member hanging downward from said support member; and at least one releasable holder on each elongate member, the holders positioned to support at least one aircraft stringer at spaced apart positions to enable the stringer to be supported at an aircraft assembly jig for loading thereon, said system for subsequent assembly at a jig, the method comprising:

positioning a plurality of stringers in said releasable holders so that the stringers lie alongside each other, forming the assembled elongate members and stringers as a package, transporting the package to an aircraft assembly jig, and lifting the support member by suitable means so as to unpack the assembly and position the stringers at the jig for loading thereon.

* * * * *